US007024746B2

(12) United States Patent
Weeks et al.

(10) Patent No.: US 7,024,746 B2
(45) Date of Patent: Apr. 11, 2006

(54) METHOD AND APPARATUS FOR MONITORING BLIND FASTENER SETTING

(75) Inventors: Geoffrey Weeks, Burton-upon-Trent (GB); Darren Hull, West Midlands (GB); Stephen Godwin, Birmingham (GB); Guy Jackson, Birmingham (GB)

(73) Assignee: Newfrey LLC, Newark, DE (US)

( * ) Notice: Subject to any disclaimer, the term of this patent is extended or adjusted under 35 U.S.C. 154(b) by 378 days.

(21) Appl. No.: 10/619,270

(22) Filed: Jul. 14, 2003

(65) Prior Publication Data

US 2004/0063362 A1 Apr. 1, 2004

(30) Foreign Application Priority Data

Jul. 18, 2002 (GB) .................................... 0216724

(51) Int. Cl.
*B23Q 17/00* (2006.01)
*B23P 11/00* (2006.01)

(52) U.S. Cl. ............................... 29/407.08; 29/407.05; 29/407.1; 29/525.06; 29/243.519; 700/108; 700/110; 72/391.4

(58) Field of Classification Search ............. 29/407.05, 29/407.08, 407.09, 407.1, 525.06, 243.519, 29/243.521; 700/108, 109, 110, 175, 180; 73/756, 774, 849; 72/391.4
See application file for complete search history.

(56) References Cited

U.S. PATENT DOCUMENTS 3,292,413 A * 12/1966 Falcioni ........................ 72/377
4,995,148 A * 2/1991 Bonomi et al. ............. 29/26 A
5,396,703 A * 3/1995 Rice ......................... 29/898.09
5,404,643 A * 4/1995 Rice ......................... 29/898.09
5,502,884 A * 4/1996 Ladouceur ................ 29/407.05
5,590,453 A * 1/1997 Gajewski .................. 29/407.05
5,600,878 A * 2/1997 Byrne et al. ........... 29/243.525
5,673,839 A * 10/1997 Howard et al. ............. 227/119
6,014,804 A * 1/2000 Lulay et al. .................. 29/715
6,092,275 A * 7/2000 Kellner et al. ........... 29/525.06
6,176,000 B1 * 1/2001 Lulay et al. ............. 29/407.05
6,240,613 B1 * 6/2001 O'Connor et al. ....... 29/407.01
6,276,050 B1 * 8/2001 Mauer et al. ................. 29/716
6,446,319 B1 * 9/2002 Lulay et al. ............. 29/407.08
6,502,008 B1 * 12/2002 Maurer et al. .............. 700/175
6,843,326 B1 * 1/2005 Tambini ......................... 173/1
6,951,052 B1 * 10/2005 Clew ........................ 29/525.06
6,961,984 B1 * 11/2005 Naito et al. .............. 29/407.08
2003/0074102 A1 * 4/2003 Mauer et al. ............... 700/175
2004/0060363 A1 * 4/2004 Smith ........................... 73/849
2004/0167660 A1 * 8/2004 Mauer et al. ............... 700/175
2004/0189232 A1 * 9/2004 Cho ............................ 318/484

FOREIGN PATENT DOCUMENTS

DE 37 15 905 A1 12/1988
DE 4217901 12/1993

(Continued)

*Primary Examiner*—Essama Omgba
(74) *Attorney, Agent, or Firm*—Harness, Dickey & Pierce, P.L.C.

(57) ABSTRACT

A method of monitoring the setting operation for a blind fastener comprising the step of measuring, as a function of time, an electronic signal indicative of the load being applied to the fastener during the setting operation and, from which, determining a mandrel entry load and associated mandrel entry time from this measured signal and an associated setting time, subsequently determining the time difference between the mandrel entry time and the setting time and comparing this time difference against a predetermined reference time difference associated with that particular fastener type to determine whether the set fastener complies with predetermined acceptable setting procedures.

20 Claims, 5 Drawing Sheets

FOREIGN PATENT DOCUMENTS

| | | | | |
|---|---|---|---|---|
| DE | 44 01 155 | A1 | | 7/1995 |
| DE | 202 10 840 | U1 | | 7/2003 |
| EP | 462707 | A2 | * | 12/1991 |
| EP | 0 594 333 | A1 | | 4/1994 |
| EP | 0 738 551 | A2 | | 10/1996 |
| EP | 738550 | A2 | * | 10/1996 |
| EP | 738551 | A2 | * | 10/1996 |
| EP | 0 995 518 | A2 | | 4/2000 |
| EP | 0 995 519 | | | 4/2000 |
| EP | 1382406 | A2 | * | 1/2004 |
| EP | 1447157 | A1 | * | 8/2004 |
| WO | WO 00/21700 | | | 4/2000 |
| WO | 03/059550 | A1 | | 7/2003 |
| WO | WO 03/059551 | | | 7/2003 |

* cited by examiner

METHOD AND APPARATUS FOR MONITORING BLIND FASTENER SETTING

FIELD OF THE INVENTION

The present invention relates to an improved method and apparatus which is capable of monitoring the application and setting of blind fasteners. More particularly, the present invention is directed towards apparatus for monitoring the sequential application and setting of such blind fasteners.

BACKGROUND AND SUMMARY

Conventional blind fasteners, such as blind rivets, comprise an outer tubular shell having an enlarged flange at one end, together with a mandrel associated therewith, such mandrel comprising a cylindrical stem extending through the tubular body so as to be co-axial therewith and the stem being coupled with a remote end of the body, usually by having a radially enlarged head at one end for engagement with an end-face (tail end) of the rivet body remote from the enlarged flange. The blind rivet is passed through a preformed hole in a workpiece until the flange engages with the edge of the hole and is held in engagement therewith during a setting operation. During setting, the remote end of the rivet, which is disposed inwardly of the workpiece (the blind side), is then compressed towards the flange by drawing the mandrel stem, and hence the mandrel head, back towards the flange, whereby the deformed portion of the rivet body compresses the workpiece therebetween with the flange. Conventionally, many mechanical assemblies use blind rivets to secure one or more components together in a permanent construction. Blind fasteners are preferred where the operator cannot see or access the blind side of the workpiece—for instance where the rivet is used to secure a secondary component to a hollow boxed section. Blind rivets are also preferred where a high volume of assemblies are being produced as there are advantages to be gained from increased assembly speeds and productivity compared with, say, threaded or bolted joints.

However, one of the disadvantages of a blind rivet setting is that the blind side of the set rivet is often inaccessible and therefore cannot be visually inspected to determine a correctly completed joint. Additionally, even if visual inspection was possible, for rivet setting operations utilising a plurality of blind rivets of different sizes for insertion in different sized holes, a visual inspection may also fail to identify if an incorrectly sized rivet has been used in a particular hole diameter. Alternatively, in automated blind rivet setting procedures it is also possible that a blind rivet may not be set at all during a particular automated cycle or may be "free set" in air remote from any workpiece. A secondary operation of visually or manually inspecting an assembly following a preset automated blind rivet setting operation would introduce an additional manufacturing step and associated expense into the manufacturing procedure.

To address such problems, automated blind rivet setting monitoring operations have been developed which effectively measure the force applied to the rivet mandrel during a cyclic fastener setting operation. For example, the applicant's earlier European Patent No. EP 738 551 measures the load applied to the mandrel stem during the rivet setting operation against the displacement of the piston assembly within the rivet setting tool, and analysing the results of such measurements against pre-determined settings to determine whether the set rivet falls within acceptable parameters and can be considered as a "good" set. This disclosure further discusses the benefits of analysing the velocity of the piston displacement compared to the applied load to also compare against pre-determined values.

A second patent in the name of the Applicant, EP 738 550 discloses a similar means of analysing the setting operation of a blind rivet but in this case measures the setting force against displacement of a gripping mechanism of the rivet setting tool so as to analyse the total energy employed during the rivet setting operation, and to compare with pre-determined values to determine whether or not the set blind rivet falls within acceptable parameters.

Whilst both the aforementioned analysis techniques provide a very thorough and effective means of determining the quality of a set blind rivet, both employ complex analytical techniques in order to determine the quality of the setting operation, usually by monitoring step by step, almost continuously, the resulting load/pressure-displacement curve, requiring complex software to effect such analysis adding considerable cost to the rivet setting equipment. Additionally, since the analysis techniques are relatively complex, such techniques do not lend themselves to a high degree of flexibility in readily adapting the apparatus to analyse the setting operation for different types and sizes of blind rivet, particularly where different fasteners are used sequentially.

A more simplified rivet setting monitoring process is also disclosed in German Patent Specification DE4217901 (Honsel) which simply measures the displacement force exerted by the setting tool against the displacement of the piston of the setting tool, and from analysis of such results determining if a set rivet is within acceptable parameters. However, the drawbacks of all existing blind rivet monitoring processes is the necessity to use at least two transducers to not only measure the force applied to the rivet during the setting operation but to also measure a manual displacement of at least one piston of the rivet setting apparatus. In addition, none of the prior art has addressed the possibility of adapting such monitoring equipment to deal with large scale rivet setting operations utilising a plurality of rivets and/or rivets of different size and shapes. Prior art devices are limited to analysis of one type of blind rivet only at any one time.

Despite the various complex and expensive blind fastener monitoring systems currently available, a need has been further identified to provide a simplistic and inexpensive device and procedure to monitor the operation of a blind fastener setting tool in order to identify, and specifically provide an appropriate visual or audible warning of, the occurrence of a "free set" fastener setting operation in which a rivet may be set remote from the workpiece.

It is therefore an object of the present invention to provide a simplified method of monitoring the setting operation of such blind fasteners and a blind fastener setting system employing such method which alleviates the aforementioned problems in a cost effective manner and which has greater flexibility in its application to automated fastener setting operations.

According to the present invention there is provided a method of monitoring the setting operation for a blind fastener, comprising the steps of measuring, as a function of time, an electronic signal indicative of the load being applied to the fastener, and more specifically the load applied to the mandrel, during the setting operation, from such signal determining a mandrel entry load and an associated mandrel entry time; further determining mandrel break point or a setting load (mandrel break point load) and an associated mandrel break point time or setting time; subsequently, determining the time difference between the mandrel entry time and the mandrel break point/setting time and comparing this time difference against a pre-determined reference time difference value associated with the fastener to determine whether the set fastener complies with a pre-determined acceptable setting procedure.

Preferably, the method will also determine the difference between the mandrel break point or setting load and the mandrel entry load and compare this difference in load against a pre-determined reference load difference value to again determine whether this set fastener complies with pre-determined acceptable setting procedure.

In the event that the set fastener is determined to not comply with the pre-determined fastener setting procedure due to either or both of the load difference or the time difference being incompatible with the pre-determined difference values, then an output signal will be generated, which itself will either be audible or visual, so as to notify a user of a potential difficulty with the fastener setting procedure being monitored.

Preferably, this method will further comprise the step of analysing the difference between the determined time difference and the reference time difference when the fastener set is determined not to comply with the pre-determined fastener setting procedure, whereby such analysis will be used to identify the reason for non-compliance, usually by determining whether the difference is greater than or less than the pre-determined difference values which is indicative of certain known failure criteria.

In one preferred embodiment of the present invention, the predetermined reference time difference may be determined as the time difference between mandrel entry time and mandrel setting time of a blind fastener set in a known workpiece, and the step of comparing the measured time difference against the predetermined reference time difference comprising identifying whether or not the measured time difference is greater than the reference time difference by a predetermined value indicative of a free set operation and generating a reject signal in the event that such free set operation is detected.

Additionally, the method may further comprise the step of determining a minimum load value after the mandrel entry load is determined, which minimum load value having an associated minimum load time, subsequently comparing the at least one of the minimum load value or the minimum load time against a pre-determined minimum load value or pre-determined minimum load time to identify the reason for non compliance, again by determining whether the variation between the measured value and the pre-determined value is greater or less than, with such results indicative of certain known failure criteria.

Preferably, the method will further comprise the step of visually displaying a graphic plot of monitored load applied to the mandrel against time to aid visual interpretation of the setting procedure.

The method of the present invention is further applicable to a method of monitoring a series of setting operations for at least two different blind fasteners, comprising the step of pre-determining the sequence of blind fasteners to be set in the series and monitoring the setting operation of each of the fasteners in the series according to the method described above, wherein the pre-determined reference time and the predetermined reference mandrel load associated with each of the at least two different blind fasteners is pre-set against each of the setting operations for that particular fastener in the series. Specifically, the method employs the use of undertaking a series of monitoring procedures as previously described, whereby each monitoring procedure will be dependent on the pre-determined characteristics of the fastener being set which will be pre-set to an appropriate monitoring system. This specifically allows for the method to determine if the incorrect fastener is set out of sequence since its determined values will not comply with those pre-set for a different type of fastener.

Usually, the pre-determined reference load values associated with each of at least two different blind fasteners will also be pre-set against each of the setting operations for that fastener in the series.

Preferably, the pre-determined reference time is determined by undertaking a plurality of setting operations for the selected fastener type, preferably in the component being assembled, measuring a signal indicative of the load being applied to the fastener during the setting operation, as a function of time, from which signal measurements the mandrel entry load and associated mandrel entry time may be determined together with a setting load (mandrel break load) and associated mandrel break or setting times for each of the plurality of operations, following which the determined values of mandrel entry load, mandrel entry time, mandrel break or setting load and mandrel break or setting time for the plurality of operations are then averaged and from such averaged values the time difference between the average mandrel entry time and the average setting (mandrel break) time are calculated to provide this pre-determined reference time difference. Similarly, the pre-determined reference load can also be calculated by averaging the mandrel entry load and the mandrel break or setting load and determining the difference therebetween as the reference load value.

Alternatively, the pre-determined reference time may be determined by again undertaking a plurality of setting operations for each selected fastener type and for each of the plurality of operations, preferably in the component being assembled, determining the time difference between the mandrel entry time and the mandrel break or setting time and then simply averaging the determined values of these time differences for the plurality of operations to provide the pre-determined reference time. In both situations, the pre-determined values against which each subsequent operation is to be compared to determine whether or not the fastener setting procedure is acceptable, may be achieved through a self learning process and by measuring the operation and setting of the fasteners in situ and thus each pre-determined reference time or reference load can be calculated dependent on the exact situation in which the fasteners are to be employed. Again, the pre-determined reference load difference may alternatively be calculated by measuring the difference between the mandrel entry load and the (or mandrel break) setting load for each of said plurality of operations, and averaging these load differences to obtain a reference load value difference.

Usually, where the method is applicable to monitoring a series of setting operations, these multiple setting operations may be undertaken by a plurality of different setting tools wherein an electronic signal indicative of applied load to the mandrel is generated by each setting tool during a setting operation by that tool and each electronic signal is analysed sequentially according to the pre-determined order of setting of blind fasteners. Here the pre-programming of the series of setting operations not only allocates the order of fasteners to be set but also which setting tool is to set those fasteners and in which particular order, and which pre-determined values are to be applied to the monitoring operation for each setting operation.

The method as previously described, may be further used to determine wear on a set of jaws of a fastener setting tool by comparing the mandrel entry time against a pre-determined mandrel entry time. Here, if the fastener setting tool jaws are subject to wear then they may slip when engaging a mandrel stem of the fastener thus delaying the fastener setting cycle load being applied such that the mandrel entry load will be delayed to account for the slipping. This will allow the operator to monitor the performance of the components of the setting tool, but the effect of slippage will not affect the monitoring operation of the setting procedure itself since, once the mandrel is correctly gripped, such slippage will not affect the time between mandrel entry and mandrel setting.

Further according to the present invention there is also provided a blind fastener setting system comprising a fastener setting tool, a signal generating device for producing a signal indicative of the load being applied via the mandrel to a blind fastener during a setting operation, and a signal processor for measuring this signal as a function of time and performing the monitoring method for the setting operation as described above. Usually, the system may comprise a plurality of setting tools, each tool having an associated signal generating device and controlled by said system to be operated in a pre-determined sequence.

It is also preferable that the system will comprise an automated fastener feed system for supplying blind fasteners to the or each setting tool in a pre-determined sequence.

It is usual that the fastener setting tool will comprise a fluid actuated piston for applying load to the fastener whereby the signal generating device may comprise a pressure transducer for measuring the pressure applied to the piston as indicative of the load applied to the fastener. The applied load could, alternatively be determined by a number of alternative methods and associated devices including load cells, strain gauges or, more particularly, piezo-electric load measuring devices. The signal processor of the system may itself comprise a visual display for plotting the signal output versus time, either by way of a hard copy plot (such as a printer) or by a visual display or computer screen. The system may also comprise an indicator means, which could include the visual display discussed above, which indicator means being actuated in response to the output signal generated by the measuring method discussed above to indicate non compliance of the rivet setting procedure.

BRIEF DESCRIPTION OF THE DRAWINGS

A preferred embodiment of the present invention will now be described, by way of example only, with reference to the accompanying illustrative drawings in which.

DETAILED DESCRIPTION

Figure 1:
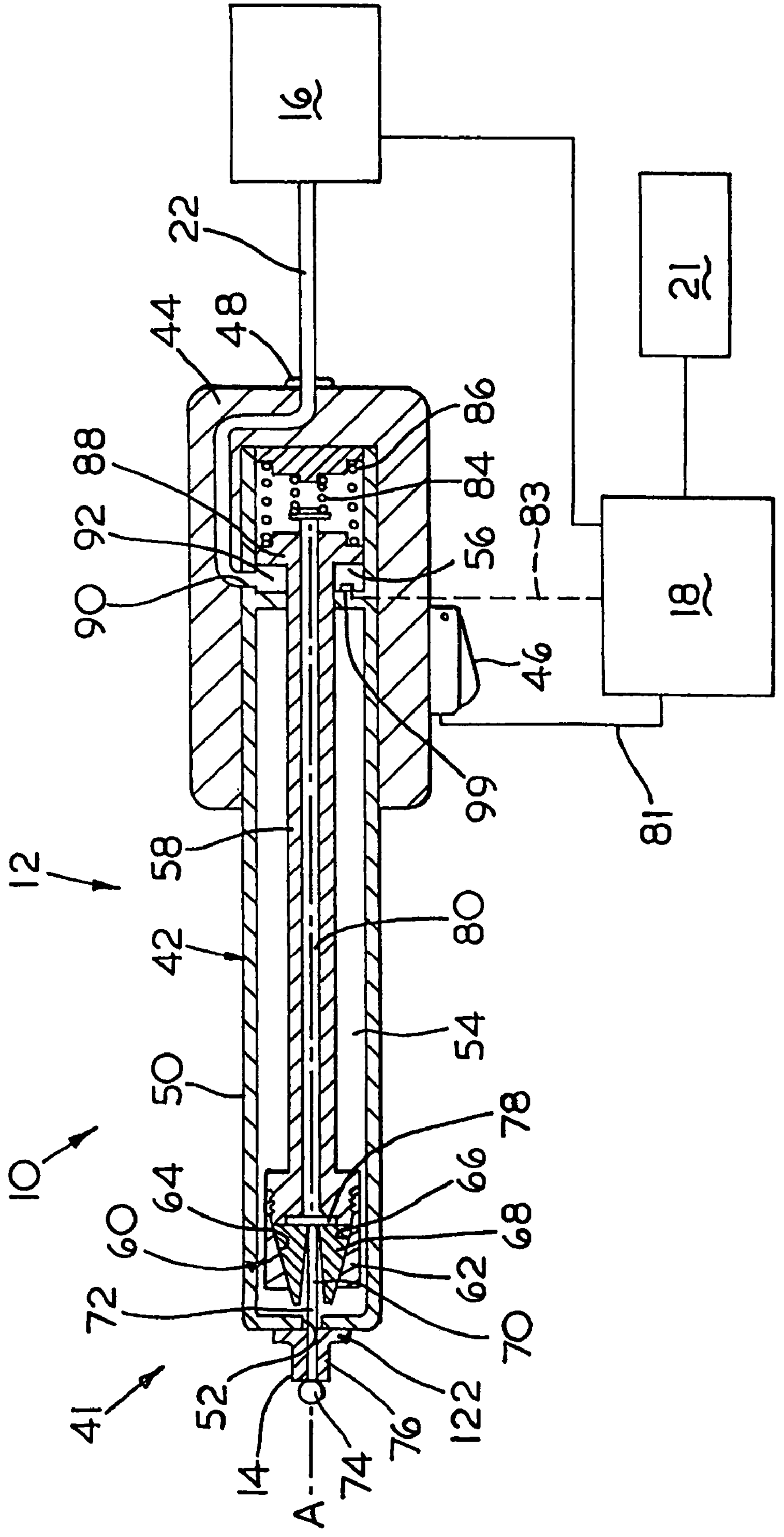
FIG. 1 is a schematic cross section of a blind rivet setting system according to the present invention.

Referring now to FIG. 1, a conventional blind rivet setting tool is schematically illustrated. A blind rivet setting system (10) comprises a rivet setting tool (12) for setting a blind rivet (14) a hydraulic intensifier (16) and system control circuit shown schematically as (18). The intensifier (16) may be any one of a number of conventional such intensifiers commonly used within the art but may simply be considered as a fluid pressure source for controllably applying pressure to the setting tool (12) by means of hydraulic fluid transferred via a fluid connection pipe (22). Often, intensifiers (16) of this type employ a pressure source, such as pressurised air applied to a cylinder, to compress a hydraulic oil or fluid to transfer fluid pressure to the setting tool. The fluid contained in the intensifier (16) may be considered to be in continuous fluid communication, through pipe (22), with the rivet setting tool (12).

The tool (12) comprises an elongated body generally illustrated as (42) which may be of any of several constructions but is preferably shown here provided with a handle (44). A trigger switch (46) which actuates to the tool (12) is fitted in the handle (44) in a conventional manner and is operatively associated with a valve (48).

The elongated body (42) includes an elongated housing (50), which housing (50) includes a mandrel-passing aperture (52) defined in a front end (41).

In this embodiment, the housing (50) is sub divided internally into a front chamber (54) and a hydraulic cylinder chamber (56), wherein the elongated body (42) further includes an axially movable pulling shaft (58) provided along its longitudinally extending axis. It will be understood that the construction of the housing (50) is only one of a significant number of variations, where the only essential feature being that it provides support for the pulling shaft (58) and for a means of axially moving this shaft (58).

A jaw assembly (60) is operatively associated with the front end (41) of the pulling shaft (58). The jaw assembly (60) includes a jaw cage (62) having an internal bevelled wedging surface (64) that defines an internal bore (66). An array of split jaws (68) are movably provided within the cage (62). When the outer surfaces of the split jaw (68) act against the bevel surfaces (64), the jaws (68) engage and grip an elongated stem (70) of a mandrel (72) of a blind rivet (14). The mandrel (72) also includes a mandrel head (74). The rivet (14) includes a tubular deformable sleeve (76). A variety of methods may be employed to manipulate the jaw assembly (60) to grasp and hold the stem (70) of the mandrel (72), but the method described hereafter is merely illustrative and is not limiting on the invention.

A pusher (78) is fixed to the forward end of a pusher rod (80), which itself is housed within a central through bore defined in the pulling shaft (58). The pusher rod (80) is axially movable within this through bore and is biased, at this rear end, against the back wall of the hydraulic cylinder chamber (56) by a spring (84). A weaker spring (86) acts between the same wall and the rear end of the pulling shaft (58).

A piston (88) is fixed to the pulling shaft (58) and is capable of axial motion in both forwards and rearwards direction within the hydraulic cylinder chamber (56). The hydraulic intensifier (16) forces a pressurised fluid (not shown) through the pipe (22) into the cylinder chamber (56) on the forwards side of the piston (88) through a pressurised fluid port (90) into a pressurisable side (92) of the hydraulic cylinder chamber (56). By introducing a pressurised fluid into the fluid-tight chamber defined within the pressurisable side (92) the piston (88) is forced to move rearwardly (from left to right as viewed in FIG. 1), causing the jaw members (68) to clamp and apply a setting force to the mandrel stem (70) eventually causing it to break away from the mandrel head (74) as will be described below.

The tool (12) is fluidly connected with the remote intensifier (16) through the pipe (22). Provided in operative association with the intensifier (16) is a pressure transducer (99). In the current embodiment this transducer is shown disposed within the hydraulic cylinder chamber (56). Since the purpose of the hydraulic transducer is to measure the hydraulic fluid pressure applied to piston (88), this transducer (99) may be displaced anywhere that is in fluid communication with the intensifier and piston (88), including an output chamber of the intensifier (16) (not shown) or even in communication with the pipe (22). For convenience, in the current embodiment it is shown within the setting tool itself. The transducer (99) simply serves to measure hydraulic fluid pressure applied to the piston (88) and provide an electrical output signal indicative of the pressure detected. The transducer (99) may be selected from a variety of types and is adapted to sense the amount of hydraulic pressure applied to the pulling head (12) during the rivet setting process and produces an output signal (P) related to this pressure. The system control circuit (18) will not be described in any great detail herein but employ an appropriate conditioning circuit for receiving the output signal from the pressure transducer (99) and converting analogue signal to a digital signal, which will also be passed through an appropriate amplifier circuit (not shown) which monitors the signal throughout the riveting cycle, preferably sampling the transducer circuit at one millisecond increments over a total time of one second.

The name "blind rivets" is derived from the fact that such rivets are installed from only one side of a workpiece or application, the primary side of the blind rivet (14) includes the tubular rivet sleeve (76) having a flange (122) at its rear end as shown in FIG. 1. The mandrel (72) has a stem (70) that passes through the tubular rivet body or sleeve (76) and has an enlarged mandrel head (74) formed at one end thereof. Although not shown, the mandrel stem is provided with a weakened portion which has a pre-determined breakpoint which will break when a sufficient load is applied. This is conventional within the field of blind rivet setting and need not be discussed in any great detail herein. The rivet (14) is loaded within the setting tool (12) as shown in FIG. 1 and then introduced into a hole passing through an appropriate workpiece (not shown) such that the mandrel head and forward end of the sleeve (76) project through to the "blind side" of the workpiece. The mandrel stem (70) is then clamped between the split jaws (68) and is pulled by the setting tool (12). As the pulling shaft (58) is forced rearwardly (left to right) by fluid pressure being introduced into the hydraulic cylinder chamber (56) so as to displace the piston (88) against the resistance of the weakest spring (86), the pusher rod (80), biased against the stronger spring (84), resists this rearward movement causing the pusher (78) to act against the rear of the split jaw (68) pushing them into and against the tapered internal bevelled wedging surface (64) causing the jaws to grip to the mandrel stem (70). Once the stem is gripped, the split jaw (68) are fully lodged between the surface (64) and the mandrel stem (70), the pusher rod (80) moves rearwardly with the pulling shaft (58), the biasing force of the strongest springs (84) now having been overcome. As the jaw assembly (60) is carried rearwardly by movement of the pulling shaft (58) (resulting from an increase in pressure in the chamber (56)) the head (74) of the rivet (14)is drawn into and enters the sleeve (76) as is conventional for setting of such blind rivets. This is denoted as the "mandrel entry point" and is the point at which the sleeve (76) begins to deform as the enlarged mandrel head is drawn therein. The pressure or load being exerted at this stage is referred to as the mandrel entry load. As the mandrel (72) continues to be pulled, the rivet sleeve (76) is deformed up to the secondary or blind side of the workpiece being clamped and this deformed part of the sleeve (76) acts as secondary clamping element, whereas the flange (122) becomes the primary clamp element such that the workpieces are clamped therebetween. It is this combination of the secondary and primary clamp elements that hold two or more parts of an application or workpiece together.

Continued rearward movement of the jaw assembly (60) by movement of the pulling shaft (58), pulls the head (74) into the sleeve (76) causing maximum deformation. Once the head (74) reaches the secondary side, it is restrained from further axial displacement and the mandrel (72) therefore breaks at the neck portion previously described, the force being applied at breakpoint being referred to as the maximum setting force (or load), wherein the secondary clamp element is now created by the combination of the now detached head (74) being retained within the deformed sleeve (76). The fluid pressure within the chamber (56) is then released by releasing the setting tool trigger (46) and effecting appropriate control and displacement of the hydraulic intensifier (16), whereby both the pulling shaft (58) and the pusher rod (80) are restored to their pre-engaged positions by the biasing forces of the springs (84 and 86). With the force of the jaws (68) removed, the jaws (68) are relaxed to their pre-engaged positions and the stem (70) is released and discarded. The tool (12) is then ready to repeat this rivet setting cycle.

In practice, once the rivet (14) has been inserted into the tool (12), the trigger switch (46) is actuated and initiates, via a control line (81), an appropriate electronic clock (not shown) within the control circuit (18), and which circuit (18) simultaneously activates the hydraulic intensifier (16) which provides a progressive increase in the fluid pressure through pipe (22) to chamber (56). The transducer (99) detects the increase in fluid pressure within chamber (56) and transmits an appropriate signal (via control line (83)) back to the control circuit (18) which, as previously described, monitors therefore the pressure within chamber (56) as a function of time. The measurements detected by the control circuit (18) are now graphically represented in FIG. 2 as a plot of pressure (P) against time (T). Since the piston size remains constant, the measured value of P is directly proportional to the force or load applied to the mandrel (72).

Initially, the intensifier (16) increases the volume of fluid being transferred into the chamber (56). However, since the piston plate (88) is restrained from displacement by virtue of the engagement of the jaws (68) with the mandrel stem (70), the pressure within this chamber (56) also increases lineally as indicated by region 102 of the graph in FIG. 2. The actual force (or load) being exerted on the mandrel stem (70) of the mandrel (72) is directly proportional to the increase in pressure since the area of the piston (88) remains constant. Resistance to displacement of the mandrel (72) is effected by engagement of the mandrel head (74) with the free end of the rivet body (76). However, as pressure continues to increase and thus the force exerted on the mandrel stem increases, eventually the mandrel head (74) will be drawn into the rivet body (76), as is conventional, resulting in a associated displacement of the mandrel (72), from left to right as viewed in FIG. 1, and corresponding displacement of the piston plate (88) creating in an increase in volume of chamber (56).

Figure 2:
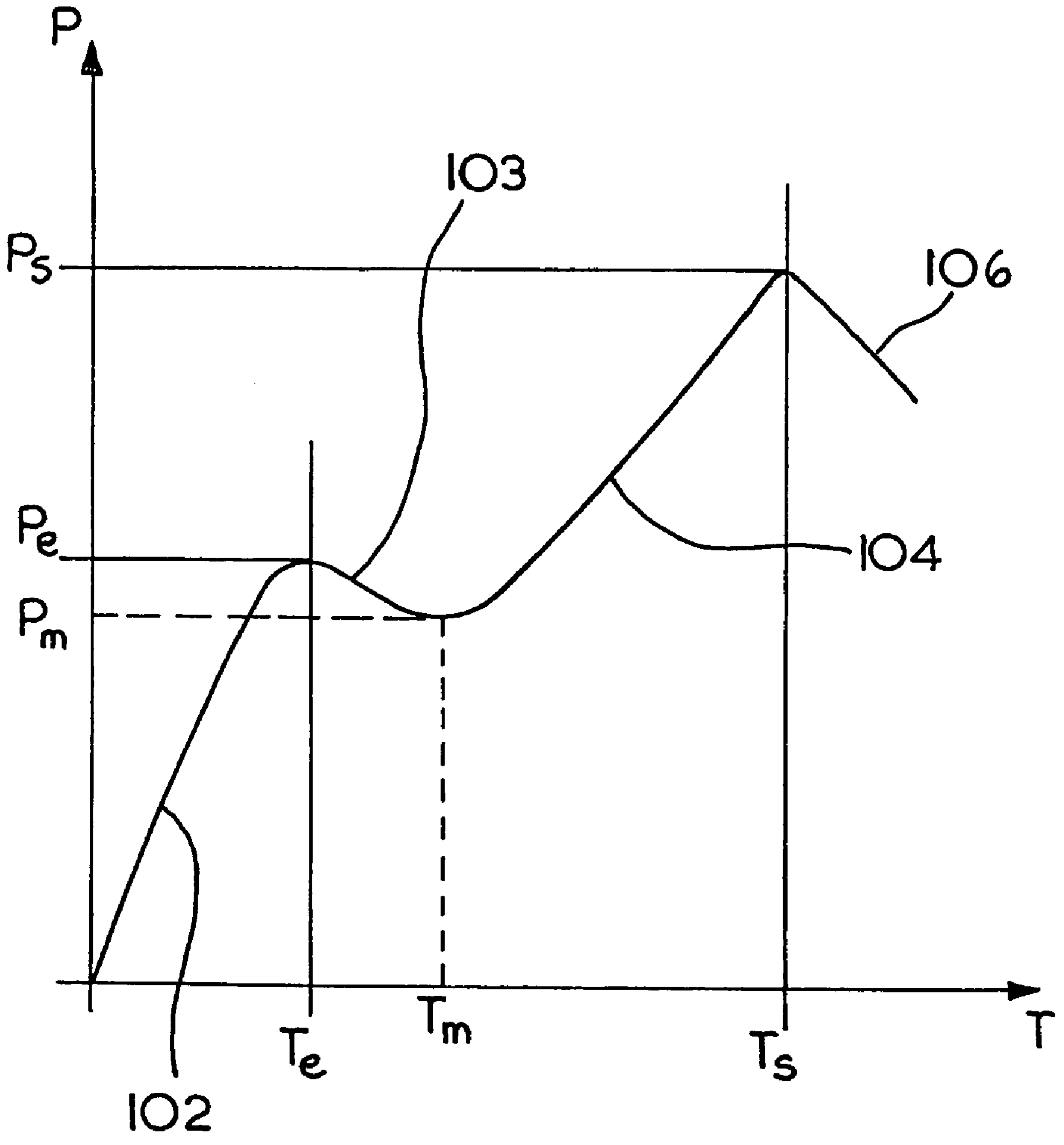
FIG. 2 shows a co-ordinate graph illustrating a load versus time waveform for a blind rivet setting operation, with load measured along the X axis and time being measured along the Y axis.

This is clearly represented on the pressure/time graph as a gradual increase of pressure (102) with time (corresponding to resultant increase in load on the mandrel stem) until sufficient load is supplied to the mandrel to effect the mandrel head (74) to overcome the resistance of the rivet body (76) and be drawn therein. This mandrel entry load ($P_e$) is defined by the initial pressure (load) peak necessary to force the mandrel head into the rivet body. As the mandrel head (74) continues to be drawn into the body (76), thereby deforming it on the blind side of the workpiece, this subsequent displacement is associated with a reduction of resistance on the mandrel head (74) and results in a decrease in pressure (103) (and therefore force) being applied to the rivet (14). Subsequently, the deformed rivet body (76) engages with the blind side of the workpiece restraining it from further mechanical deformation and thus preventing continued axial displacement of the rivet head (74). It is well understood that once the mandrel head has started to enter the rivet body the resistance to displacement of the mandrel head is significantly reduced and thus a lower load or force is sufficient to continue this deformation. This decrease in pressure and associated load on the mandrel reaches a minimum value indicated as $P_m$ occurring at a time $T_m$ on the curve as shown in FIG. 2. Further, since the rate of the deformation of the rivet body is greater than the subsequent (constant) increase in fluid volume being transferred to the chamber (56), the resultant pressure in the chamber (56) decreases at this stage. However, once the deformed rivet body (76) engages with the blind side of the workpiece pressure begins to increase again (104) as the volume of the chamber is prevented from further increase.

Since the intensifier (16) continues to increase the fluid volume entering the chamber (56), again the pressure increases, resulting from the piston (88) again being restrained from further displacement. This second pressure increase is shown generally as (104) in FIG. 2 and represents a corresponding increase in the force being transmitted through the jaws (68) to the mandrel stem (70). Eventually, the force applied to the mandrel stem (70) will result in breakage of the mandrel stem at a pre-defined neck portion (again as is conventional) when an appropriate maximum load is achieved. This breakage results in the resistance to displacement of the piston (88) being removed, causing the piston (88) to thereby move, under the pressure in the chamber (56), rapidly from left to right resulting in a rapid pressure drop (106) as seen in FIG. 2. The point at which the mandrel stem breaks is known as the maximum setting load of the rivet (14) and is achieved with a maximum setting pressure $P_s$ occurring at time $T_s$ as indicated in FIG. 2.

Since the increase in pressure/load is measured as a function of time of the setting operation, it is thus possible to determine both the mandrel entry time ($T_e$) and mandrel break point or setting time ($T_s$), either from direct measurement of this Pressure/time curve or by appropriate determination of the associated maximum pressure values $P_e$ and $P_s$ through mathematical analysis of the received data to identify which measurement from the transducer (99) corresponds to such maximum pressure values and, since the pressure values are sampled every millisecond, the corresponding time measurement is easily derived.

FIG. 2 represents an optimum blind rivet setting operation, producing a good rivet set, with an appropriate deformation of the rivet body to clamp the workpiece between the deformed section and the rivet body flange.

Thus from determination of the values of $T_s$ and $T_e$, either through measurement from the resultant plot or by mathematical analysis of the measured signal, it is then possible to calculate the time difference between $T_s$ and $T_e$ which is indicative of the acceptability of the rivet setting procedure. Since the pressure from the intensifier (16) is applied at a constant rate for all rivet setting operations, then the corresponding time difference between $T_s$ and $T_e$ for a particular size rivet used in particular workpiece arrangement should be constant. Thus by comparing the measured value of this time difference against a pre-determined reference time value and determination that the measured value falls within a certain tolerance band of a pre-determined value then this is taken as indicative that the rivet setting operation has been carried out effectively and provides confidence that the rivet has been correctly set.

Figures 1A, 1B:
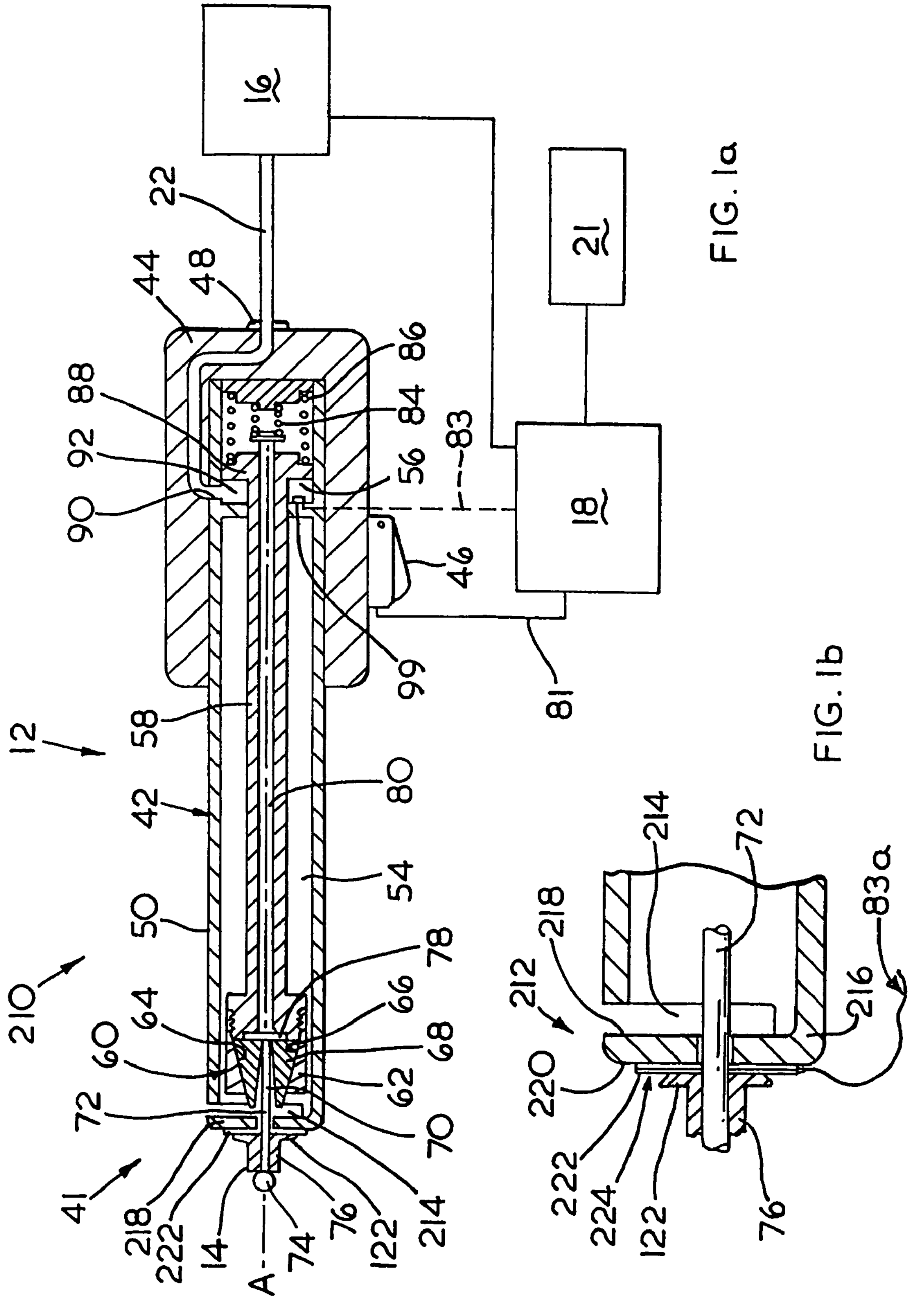
FIG. 1*a* is a schematic cross section view of an alternative blind rivet setting system according to the present invention.
FIG. 1*b* is an enlarged schematic view of the front end of the blind rivet setting tool of FIG. 1*a;*

Furthermore, whilst the preferred embodiment described above and shown with reference to FIG. 1 requires the measurement of pressure applied to the piston of the setting tool in order to calculate an appropriate force and hence load being applied to the mandrel (72) of the blind rivet (14), it will be appreciated that the invention is equally applicable to alternative means and methods for measuring such load. For example, load cells or strain gauges could be employed to directly measure the load being applied to the mandrel (72). However, in an alternative, modified setting tool design, as shown in FIG. 1*a,* a piezo-electric thin film load indicating device (such as a piezo-electric transducer or generator) can be utilised to directly measure the load applied to the blind rivet during the setting operation. Referring now to FIG. 1*a* there is shown a modified blind rivet setting tool (210). This modified setting tool of FIG. 1*a* corresponds subsequently to the rivet setting tool (10) shown in FIG. 1 which the exception that its front end is provided with a modified load measuring device (212). Here the same reference numbers are utilised in FIG. 1*a* to identify identical parts of the setting tool (210) to those shown in the setting tool (10) of FIG. 1. However, the front end of the elongated body (42), in the region of the setting tool jaw assembly, (68), is provided with an additional slot (214) (FIG. 1*b*) which extends through the diameter of the body (42) to leave a supporting bridge (216) connecting the body (42) to a remote end face (218) which engages and supports the rivet body flange (122). This supporting bridge (216) and end face (218) creates a cantilever which has mounted on its outwardly directed or front face (220) a piezo-electric thin film load indicating device (222) which is bonded by chemical bonding means such as an epoxy two part adhesive or a cyano-acryalate single part adhesive to be securely mounted thereon. A protective pad (224) is further bonded to the outer surface of the piezo-electric thin film load indicating device which protects the thin film load indicating device from mechanical damage by engagement with the rivet flange (122).

The rivet mandrel stem (70) passes through a central co-axial aperture in the cantilevered end face (218), which aperture also extends co-axially through the piezo-electric device and the protective pad, so as to be engaged by the setting jaws (68) of the tool (210). In this manner, it will be appreciated that the only significant difference in the mechanical structure of this setting tool compared to the setting tool (10) of FIG. 1 is that the end face is now cantilevered as opposed to being rigidly supported on the elongate body (42).

As the load is applied to the stem (70) of the mandrel, this load will be transmitted, via the mandrel head (74) and through the rivet body (76) to the front face (218) which will, in turn, cause the front cantilever face (218) to bend about the supporting bridge (216) whereby the higher the applied load then the cantilever will bend to a greater extent. It will also be appreciated that since this outer face of the cantilever is bending, the surface is in tension and, accordingly, this tendency for increase in length will also apply to the securely bonded piezo-electric device. The increase in tension in the piezo-electric device is related directly to the amount of strain induced into the cantilever and is thus converted directly to a low electrical voltage that can be received by the system control circuit (18) via appropriate wires (83*a*). In the setting tool (210) of FIG. 1*a* both a pressure transducer (99) (as previously described) and a piezo-electric load indicating device are used. However it will be appreciated that either can be used to measure the load being applied to the mandrel stem.

The resultant electric signal from the piezo-electric load indicating device (222) can then be analysed by the control circuit in a conventional manner to provide a direct output indicative of load being applied to the mandrel stem (72). As such, the measured output of the piezo-electric thin film load indicating device will directly reflect the load applied to the mandrel stem (72) during the rivet setting operation. As such, all foregoing and subsequent discussions within this specification discussing the measurement of a pressure-time curve are equally applicable to analysis of a strain/time curve whereby strain measured by the piezo-electric device (222) is plotted against time and instead of the measured peaks and troughs of pressure measured during the rivet setting operation of the tool of FIG. 1 here the peaks and troughs of the strain or load applied directly to the mandrel are analysed against time in a similar manner.

However, as discussed earlier blind rivets are used in situation where the operator is often unable to see the blind side or interior part of the workpiece and is thus unable to visually confirm the acceptability of the set fastener. However, it is well understood that such blind fasteners may be incorrectly set during the setting operation for a variety of reasons which will be discussed later and thus it is recognised as being important to be able to verify the acceptability of the set fastener. This is especially relevant where a number of blind rivets are to be used for securing together a particular series of workpieces (such as completing a hollow box) and that a variety of different sized blind rivets may be required varying in both diameter and or length.

In particular, if a blind rivet is employed wherein the rivet body length is too short, then insufficient deformation of the rivet body will be achieved during the setting operation to form a sufficiently large deformed portion to ensure a good joint. It is quite usual that that mandrel head will not be sufficiently drawn into the rivet body itself before the maximum setting load is achieved. The corresponding pressure time curve for an incorrectly set rivet having a body length insufficient for the workpiece thickness is shown as Plot 110 in FIG. 3 whereby once mandrel entry pressure ($P_e$) is achieved, the mandrel head (74) is initially drawn into the rivet body (76) as previously described but the initially deformed portion of the shell (76) then engages the rear of the workpiece very quickly and before the mandrel head (74) is correctly drawn into the entirety of the rivet body (76). This "early" engagement restrains further displacement of the piston (88) which is reflected by a subsequent increase in pressure until the maximum setting pressure $P_s$ is achieved. This results in the associated maximum setting time $T_{s1}$ of curve 110 being lower than the optimum setting time $T_s$ as shown in FIG. 2. In addition, since the degree of displacement of the mandrel head into the rivet body is significantly decreased then the resultant drop in pressure in the chamber (56) is also severely curtailed as reflected in the pressure/time curve (110) only undergoing a relatively small pressure decrease following the mandrel entry pressure $P_e$, to $P_{m1}$ with an associated shorter time $T_{m1}$ as clearly shown in FIG. 3. If the rivet body length is sufficiently short, it is possible that there will be no or neglible pressure drop following the entry pressure ($P_e$) measurement.

Alternatively, the rivet body being employed may be too long for the particular workpieces being connected. In this situation, the pressure again increases within the setting tool (12) as previously described up to the mandrel entry pressure, wherein the mandrel head is then drawn into the rivet body. However, in this situation the amount of displacement of the mandrel head (74) into the rivet body is significantly greater than that for the optimum rivet set procedure (as discussed with reference to FIG. 2). Thus the piston (88) is displaced to a greater degree than that for the optimum rivet setting procedure, resulting in a decrease in pressure over a longer period of time until the mandrel head is resisted, eventually, by the rear of the workpiece. The associated pressure time curve for a rivet body (76) which is greater than that recognised as optimum for a particular thickness of workpiece is shown as Plot 120 in FIG. 3. Again once, continued displacement of the rivet mandrel head (74) is resisted by the rear of the workpiece and again resultant resistant to displacement of the piston (88) is reflected by an increase in pressure until the maximum setting pressure $P_s$ is again achieved, but here it is clearly seen that $P_s$ is achieved at a maximum setting time $T_{s2}$ significantly greater than the optimum setting time ($T_s$) shown for the optimum rivet in FIG. 2.

Figure 3:
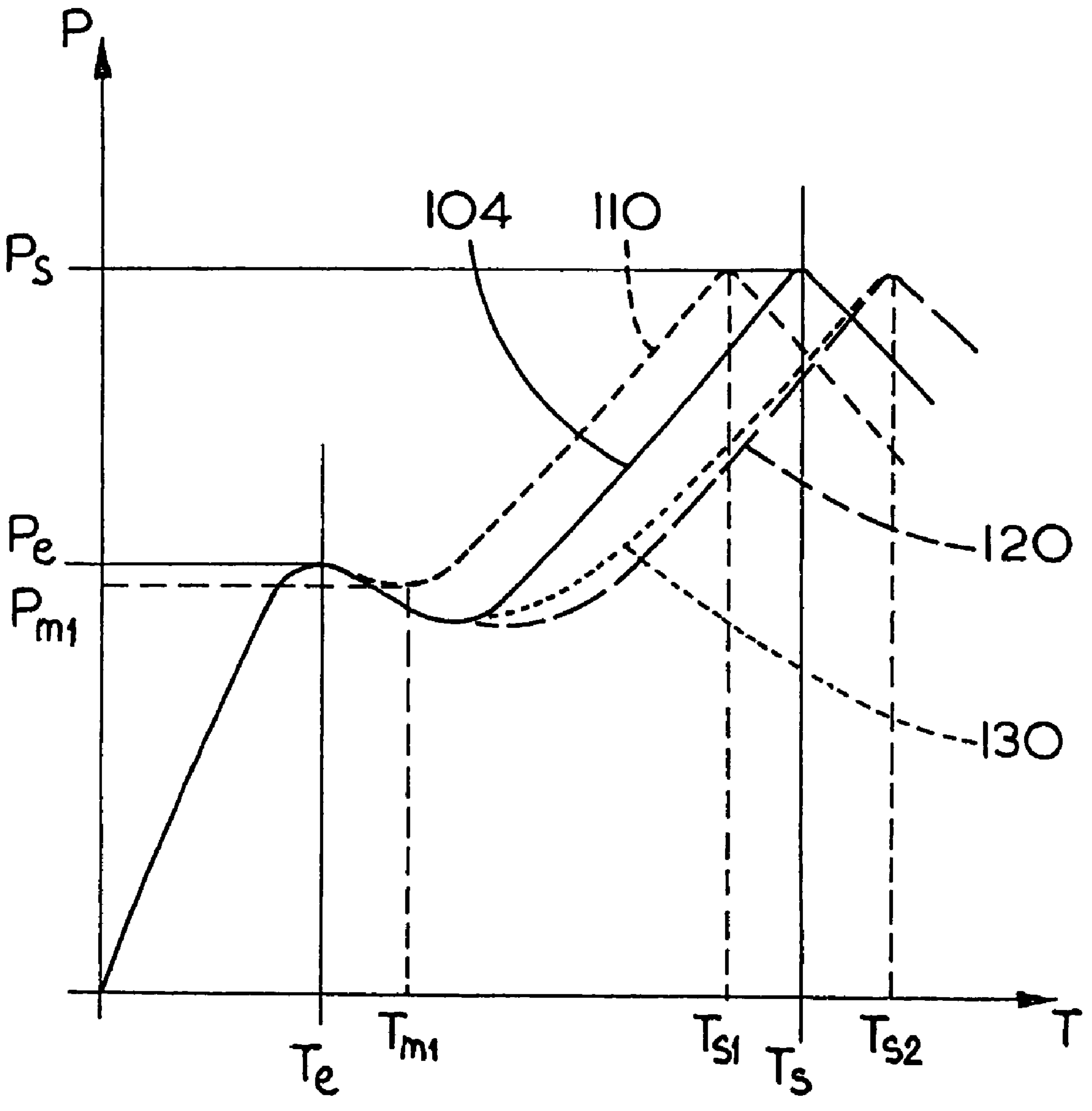
FIG. 3 shows a similar co-ordinate graph to that shown in FIG. 2, illustrating examples of incorrect setting waveforms.

The pressure/time curve 120 shown in FIG. 3 would also be reflective of "free setting" of this type of blind rivet whereby the setting tool (12) is actuated with the rivet held remote from any workpieces. Here the mandrel head (74) would simply serve to deform the rivet body (76) until it was resisted by the deformed portion (76) engaging with the rivet flange (122).

A third type of incorrect rivet setting operation is achieved whereby the diameter of the preformed holes in the workpieces into which the blind rivet is inserted is too great. This could result in "pull through" whereby the blind rivet, is of insufficient size for the deformed portion of the rivet body (after setting) to engage with the sides of the preformed hole and thus the deformed portion is simply able to be pulled through the hole in the workpiece. In this situation, the rear of the workpiece would thus be unable to stop continued displacement of the mandrel head during setting and the mandrel head will abut the region of the flange (122) of the host and break resulting in a long time to set and again a similar curve to that shown as 120 would be achieved. However, alternatively, the preformed hole may be of sufficient diameter for it to prevent "pull through" of the deformed region of the rivet body (76) but could allow the mandrel head (74) to be partially drawn through the rivet body (76) so as to lie partially within the preformed holes. In this situation, Plot 130 (FIG. 3) would be determined by the pressure/time measurement, whereby following achievement of the mandrel entry pressure ($P_s$), the mandrel head will be drawn into the rivet body as for the optimum rivet setting procedure shown in FIG. 2. However, instead of continued displacement of the mandrel head (74) being prevented by eventual engagement with the rear of the workpiece, it will be partially restricted as it partially enters the preformed holes resulting in the piston (88) being "slowed" (as compared to the optimum setting procedure)

until it eventually stops at a position representative of a greater chamber (56) volume than that that would be considered ideal. This is reflected in the pressure curve 130 being less steep as it increases towards the maximum pressure setting $P_s$ as the distinction here is a gradual “slowing” of the piston displacement (88) as opposed to it being stopped by resistance of the rear of the workpiece. Again, for pressure curve 130 the maximum setting time $T_{s2}$ is again greater than that of the optimum setting procedure.

The current monitoring system for a rivet setting tool provides for a very simplistic operation for determining the quality of the setting of the blind rivet. In particular, the system control circuit (18) and software employs appropriate algorithms to detect the two inflection points indicative of the entry pressure and the maximum setting pressure $P_e$ and $P_s$ respectively from the detected pressure within chamber (56) (by means of the pressure transducer (99)), which pressure measurements are indicative of the setting force applied to the blind rivet (14) (due to the constant area of piston (88)) and since the application of the pressure is determined as a function of time, it is possible to determine the mandrel entry time ($T_e$) and maximum setting time ($T_s$) of the rivet operation for a constant applied pressure achieved by use of the appropriate intensifier (16). The system is then able to determine the difference between the mandrel entry time ($T_e$) and the maximum setting time ($T_s$) to measure a setting time which is considered as a time difference between the mandrel entry time and the maximum setting time and which is indicative of the quality of the setting procedure for the rivet. This measured value can then be compared, by the control circuit (18) through appropriate software applications with a pre-determined acceptable value (pre-determined reference time) and if the measured value falls within an acceptable tolerance band as compared to the optimum pre-determined value (reference time), the rivet setting procedure will be considered as acceptable. Conventional electronic circuits and micro-processors allow the measurement and analysis of this type of signal to be undertaken in a number of ways and the software used to analyse such signals is readily written and is not considered to form part of the current invention. If required, as a secondary check procedure, the measured differences between the setting pressure ($P_s$) and the mandrel entry pressure ($P_e$) could also be determined and compared against a pre-determined reference load or pressure and again, if found to fall within an acceptable tolerance band, again the rivet setting procedure is considered to have passed and will be determined acceptable and indicative of a good set. However, in the event that the determined setting time falls outside of the accepted tolerance band, the control circuit (18) will then send an appropriate output signal to a visual indicator (21) to provide a visual (or alternatively audible) warning to the operator that a particular rivet setting procedure is determined unacceptable.

The pre-determined values (reference time and/or reference load) against which the measured times and, if appropriate loads/pressure, are compared may be entered into the control circuit by an operator for a particular rivet type (dependent on size, length and rivet body thickness and/or workpiece thickness) or, alternatively, the system may be set up to automatically set such pre-determined values dependent on the exact working situation. Here the control circuit (18) will comprise an appropriate microprocessor based data-manipulation system which can be programmed with an appropriate algorithm to manipulate and process data from the pressure transducer to compare pressure with time and calculate appropriate pre-determined values from measured values of acceptable rivet setting procedures.

The simplistic nature of this improved monitoring procedure provides further flexibility in its application, enabling determination as to whether or not a rivet has been “free set” as distinct from being set within the appropriate workpiece. Again with reference to FIG. 2, it is understood that where a rivet is “free set” then the maximum setting time $T_{s2}$ (curve 120) will be significantly greater than the equivalent rivet being set in the appropriate workpiece. Subsequently the measured setting time difference ($T_{s2}-T_e$) will be greater than the optimum rivet setting time ($T_s-T_e$) for that particular rivet. Thus by again analysing the setting time of each operation of the rivet setting tool, by comparison of the measured setting time ($T_{s2}-T_e$) against a predetermined time difference, (which in this case will be the optimum setting time of ($T_s-T_e$)) the system will be capable of determining that the measured time difference is greater than the optimum time difference (and any determined tolerance band) so as to indicate that the setting operation was unacceptable and/or to determine that the rivet has been, in fact, “free set”. This is of particular advantage where an operation requires a set number of rivets to be inserted to ensure an optimum connection of two workpieces. The reject signal generated as a result of determining a “free set” condition could be used to generate an audible or visual warning.

In particular, it has been determined amongst users of these types of blind fastener, that it is highly desirable to provide a simplistic and inexpensive method of detecting potentially damaging “free set” situations, particularly during sequential rivet setting operations. Thus the above system and procedure can be adapted to either exclusively, or in combination with the conventional rivet setting monitoring operation discussed above, be used to monitor operation of the rivet setting tool to detect the occurrence of “free set” operations and generate an appropriate signal as a result thereof.

In an alternative embodiment of this invention, a “free set” setting time value ($T_{s2}-T_e$) could be pre-determined and used as a reference time difference measurement to compare a measured setting time difference during the rivet setting procedure and, in the event that the measured time difference equates to the pre-set “free set” time difference (and an appropriate tolerance band value either side of that value) then the control circuit could be pre-programmed to generate a reject signal only in the event that a “free set” situation is thus determined.

Furthermore, the system may undergo a set-up procedure for a particular workpiece thickness and rivet type. Here an initial test procedure may be initiated for a pre-determined number of holes, whereby the transducer (99) is monitored so as to determine the mandrel pressure entry ($P_e$) values and the setting pressure ($P_s$) values and associated entry times ($T_e$) and maximum setting time ($T_s$) values for this pre-determined number of setting procedures from which an averaged set of values of $P_e$, $P_s$, $T_e$ and $T_s$ can be obtained $$\delta P_e=(P_{e1}+P_{e2}+\ldots P_{en})/n$$

$$\delta P_s=(P_{s1}+P_{s2}+\ldots P_{sn})/n;$$

$$\delta T_e=(T_{e1},+T_{e2}+\ldots T_{en})/n$$

$$\delta T_s=(T_{s1}+T_{s2}+\ldots T_{sn})/n$$

where n=number of test settings, and from these values an averaged time difference ($\delta T_s-\delta T_e$) can be calculated as well as an average pressure differential ($\delta P_s - \delta P_e$). These averaged values of time difference and pressure/load difference can then be automatically set by the control system as the pre-determined reference time and reference load values respectively.

Alternatively, such $T_s - T_e$ and $P_s - P_e$ values can be calculated for each test procedure and the subsequent differences for each procedure can then subsequently be averaged to determine the pre-determined acceptable reference time and reference load. Appropriate tolerance bands can then be applied for the aforementioned calculations when monitoring the rivet setting procedure in a manufacturing capacity. It will be appreciated that whilst pre-set reference values can be allocated to a particular type of rivet, the exact performance of setting of such rivets will be dependent on the workpiece thickness, pre-formed hole diameter, the pressure rate increase of the hydraulic intensifier and other variables and thus will be dependent on external parameters and whilst such external parameters may be compensated for by appropriate tolerance bands applied to "textbook" preset values, the above system provides the advantage of allowing the system and procedure to be harmonised with the exact working environment and appropriate tooling for each particular job.

It will be appreciated from the foregoing discussion that the major points of interest on the resulting pressure/time curve are determined where there is a change of direction of the graph itself representative of appropriate peaks or troughs within the load curve. The measurement of such inflection points can be readily achieved by a number of manners but notably by calculating when the rate of change or first derivative of the curve equals zero. These three identified positions where the rate of change is zero define the mandrel entry point, the minimum load and the mandrel break load as previously described. One conventional mechanism for measuring such derivatives would be to take appropriate pressure measurements at dedicated time intervals (for example at millisecond intervals) and simply calculated the first derivative until a zero value is achieved. Alternatively, such zero values rate of change can be readily ascertained by simply noting a change between increasing or decreasing load.

Figure 2A:
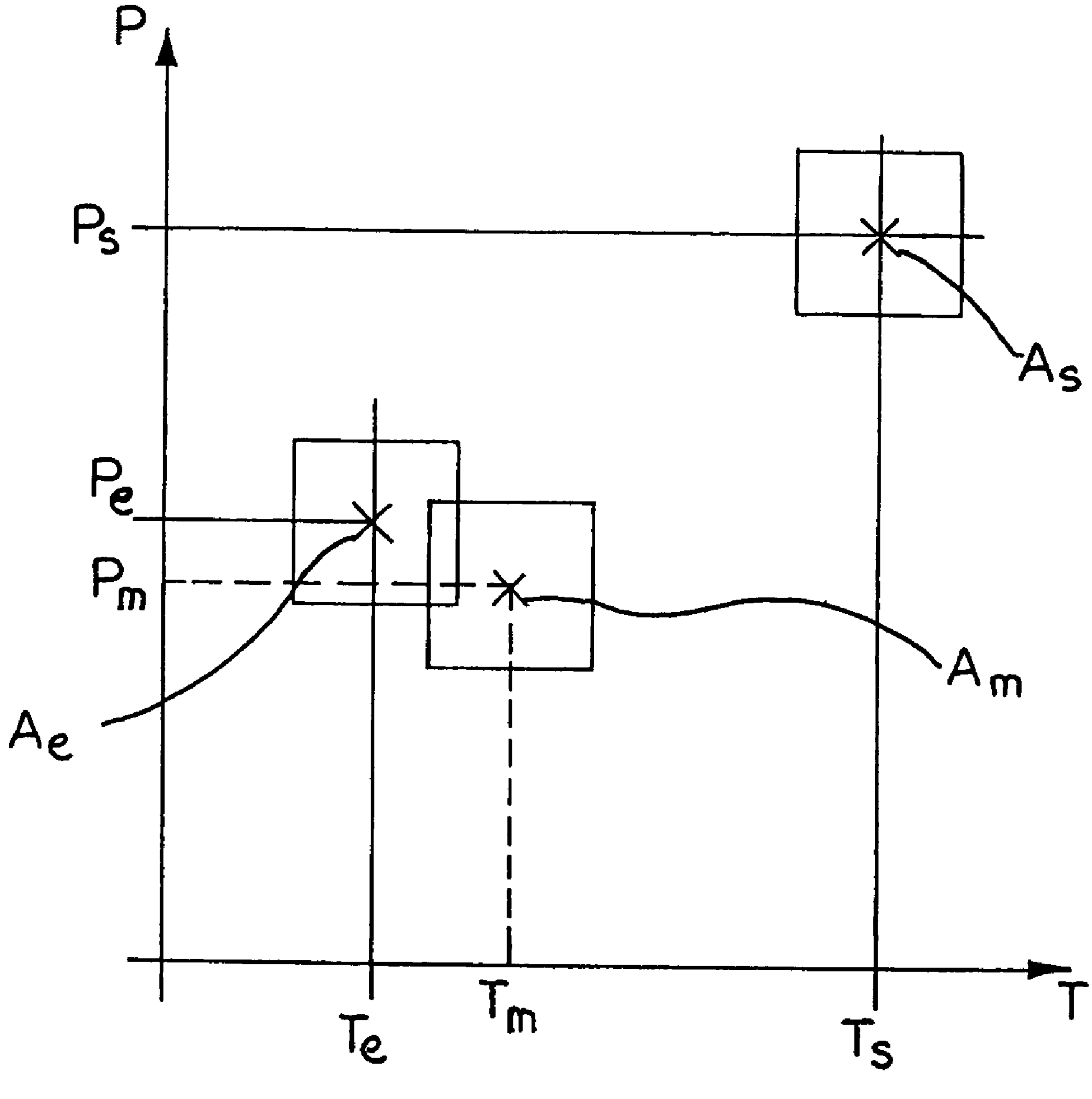
FIG. 2*a* illustrates the graph of FIG. 2 with the load time curve removed and illustrating the application of tolerance band areas to predetermined reference values of the load/time curve of a setting operation.

However, once it is identified that there are three specific regions of such load/time curves which are of major significance to the application of the method according to the present invention (ie. position equating to rate of change equal to zero), the system can be further refined so as to only undertake measurement of the load in the region of such identified positions. One method of achieving such a controlled measurement procedure is undertaken by defining an appropriate tolerance band area around each desired value. This can be achieved, for example, when undertaking the appropriate set-up testing procedures to determine the average values of $P_e$, $T_e$, $P_m$, $T_m$, $P_s$ and $T_s$, and then allocating an appropriate tolerance band plus or minus each of these average values to define the appropriate area around the averaged entry load, minimum load and mandrel break load ($A_e$, $A_m$ and $A_s$ respectively). Alternatively, these areas $A_e$, $A_m$ and $A_s$ could be defined by the minimum and maximum measured values of the appropriate mandrel entry load, minimum load and mandrel break load and associated times accordingly. These areas are clearly shown in FIG. 2*a*.

In operation, the control system (18) is then instructed to scan only when a time appropriate to the minimum elapsed time for each of the entry load measurements, minimum load measurements and setting load measurements has been reached and to then determine the measured load and time values when the rate of change is calculated as zero. This obviates the need to continuously monitor the setting operation but to allow the appropriate measurements to be taken when the rate of change to the appropriate positions is zero.

Whilst the preferred embodiment discussed above simply utilises an electronic control circuit (18) (usually in the form of a micro-processor system or other computer control system) to determine and compare the appropriate $P_s$, $P_e$, $T_s$ and $T_e$ values, and compare them against pre-determined values, it is also possible that the control circuitry could compare the entire setting curve and compare pressure or load with time over the entire setting operation. It is also possible that output (21) could be a graphical representation of the pressure time curve either as a hard copy print-out or alternatively a computer display module. This would provide a particular advantage of allowing the operator to understand why a rivet setting operation may be deemed to have failed in the event that the measured values do not correspond with the pre-determined acceptable reference values.

As previously described, and with reference to FIG. 3, where the rivet setting operation differs from the optimum procedure due to the wrong size rivets being used or the pre-formed hole being too great, it is clearly seen that the $T_s$ value between plots occurs 110, 120 and 130 will vary from the optimum time difference achieved for an acceptable rivet setting procedure shown in FIG. 2. Thus if the operator is able to visually compare the pressure/time curve against the optimum pressure time curve he will be able to determine why the operation failed and to take the necessary steps to remedy the problem to prevent it happening again and to enable correct repair of the rivet setting operation. This information may also be indicative to the operator of a problem with the workpiece eg, in the event of the correct rivet being used yet the pressure/time plot indicates that the setting procedure has failed as a result of the rivet being too short (Plot 110) or too long (Plot 120), this may indicate that the workpiece is of incorrect thickness. Thus the system and method employed herein provides an additional benefit of an active feedback to a user in the event that problems in the setting operation are determined.

For example, once the system has indicated that a particular setting operation does not comply with the pre-determined reference values, the operator may then determine whether the measured time difference during the setting operation is less than or greater than the pre-determined reference time. In the event that the measured time difference is greater than the pre-determined reference time, then with reference to FIG. 3 it will be a clear indication that non compliance has been detected due to the pressure/time curve following either plot 120 or 130. Alternatively, if the measured time difference between $T_s$ and $T_e$ is less than the pre-determined reference time then it is likely that the pressure time curve has followed plot 110 indicative of the rivet body having an insufficient rivet length. Here, the operator or the apparatus itself may determine the $P_m$ or $T_m$ values to also determine the exact reason for non compliance during the monitoring procedure. Again, the control circuit (18) can be pre-programmed with appropriate algorithms to not only detect a non compliance situation but to also provide an indication by an output signal, as to the reason why non compliance was determined. This will have particular benefit whereby the blind side of the set rivet cannot be visually inspected. For example, if a blind rivet is set which is of insufficient length to have created a adequate deformed portion on its blind side, visual inspection will not reveal this particular problem and the deformation may be sufficient that the operator cannot determine that the rivet is incorrectly set but, during use of the particular workpiece the rivet then may be worked loose and result in catastrophic failure. Thus the current monitoring system can alleviate this potential hazard by providing a warning of an incorrectly set blind rivet.

Furthermore, another advantage of the current invention is that the control system may be used to record a manufacturing history log for the particular rivet setting tool. This is particularly advantageous in automated riveting procedures whereby the automated apparatus may be programmed so as to apply a set number of rivets in a set sequence. In particular, automated rivet setting systems are well known including the applicant's automated POINT & SET (Trade-Mark) automated riveting system (as discussed in European Patent Publication No's: EP0 995 519 and EP0 995 518 amongst others) whereby delivery of the rivet into the rivet setting tool (12) is automated. This is provided by way of example only to establish that there are numerous ways of automatically inserting this type of blind rivet into this type of setting tool. Automated systems also provide for allowing different size rivets to be inserted into the same rivet setting tool (provided the mandrel diameters are constant), by simple use of computerised control means, the selectively feed rivets from different rivet hoppers. Thus it is important in such automated systems to ensure that the correct rivet has been set in the correct sequential order to have confidence in the integrity of the workpiece fastened by such rivets. Here, each automated job run will cause the operator to pre-programme the automated riveting system to deliver a set number of rivets in particular sequence whereby the rivet sizes may vary between setting operations in a pre-determined order to fix different size/thickness workpieces (for example). The same time as establishing the order of the rivets, the monitoring system can also be pre-programmed with the appropriate pre-determined reference values, as previously discussed, for that rivet in the particular sequence. Thus at each rivet setting stage, the system will undertake a rivet setting monitoring procedure as previously discussed utilising the appropriate pre-determined reference values. Thus the system not only serves to monitor that each rivet setting procedure meets acceptable performance tolerances, but will also identify that the correct rivet has been set at the correct stage of the setting sequence. It will be appreciated that in the event that the incorrect rivet size is set at a particular stage, then the pre-determined reference values allocated to that particular rivet setting operation will not correspond to the measured force or time values for the rivet that is actually set during that operation. The system will then indicate a non-compliance situation, ie. that a particular rivet setting operation is considered to have failed, and the operator will also be able to determine, from the measurement history and appropriate plot, why a non-compliance error has resulted.

In the event that no rivet has been received in the rivet tool and the rivet setting operation is commenced, again the resultant load/pressure measurements with time will clearly identify the problem since it will basically result in a linear increase in pressure with time. Detection of $T_e$ and $T_s$ values (or their absence) can identify firstly, that the measured time difference does not comply with the pre-determined reference value and thus indicate an error, and secondly, analysis of the linear increase in the pressure/time curve will indicate that the error is due to a rivet being missing during that setting operation.

The fastener monitoring system and method are equally applicable to multi rivet (or fastener) tool systems where instead of using one rivet tool to receive a plurality of different types and sizes of blind rivets for setting those different types in pre-defined sequence, the equipment could utilise a series of rivet tools each one having associated a particular size or type of rivet, and the control system programmed to utilise the correct rivet setting tool when the rivet type associated with that tool is required in a particular desired sequence. In this event, the computer control system is simply pre-programmed with the correct order for the rivet setting operation to employ the correct head in the correct sequence. Each rivet setting tool will be provided with an appropriate pressure transducer, as previously described, to provide an appropriate signal for analysis by a central processing unit of the control circuit, again as previously described, whereby a signal received from each transducer will be analysed with respect to the pre-determined reference values for the rivets being applied by that particular rivet setting tool.

It its simplest form, the present invention will simply be used to provide an output signal in the event that the measured time difference between the mandrel entry time and the maximum setting time is deemed unacceptable when compared to a pre-determined reference time, and which output signal will provide a visual (eg. a red light) or audible (alarm) signal to the operator to indicate that there has been a problem with the rivet setting operation. The operator will then be free to decide what action to take in response to the identification of an incorrect rivet setting operation.

The system could further comprise an override option allowing the system to be reset and the operator to carry on setting rivets once the bad set has been rectified.

The system could also be adapted to provide a secondary output signal in the event that an acceptable rivet setting operation is detected, such as to activate a second light source, such as a green light, to indicate that the rivet setting procedure is acceptable. These output signals could also be relied on to provide a counting operation to ensure that the correct number of rivets are applied during any particular job, whereby an operator would enter commencement of a job requiring a pre-determined number of rivets to be set for a particular workpiece, and monitor that the correct number of rivets are set before allowing the operator to progress to a new job. This rivet counting operation could also be automated to monitor the rivet volumes within a particular workplace and to automate the re-ordering procedure of such rivets and thus improve efficiency in stock control of these rivet component parts.

The major advantage of this type of system is that it is entirely flexible once it has collected the initial data. It can provide complete assurance that every rivet has been set correctly by comparing a measured setting profile against an optimum operational profile (which itself can be pre-determined by analysis of that particular rivet type in its required work setting). It can also provide information that all rivets have been set in the correct holes and to the correct grip thickness. It also provides the opportunity to monitor the number of rivets set and also tell if rivet has been free-set.

A further significant advantage of the present invention is that the system can be adapted to monitor the performance of the rivet setting tool itself. During optimum performance, the jaws of such setting tool (68) are configured so as to provide a very secure and firm grip on the mandrel stem (70) during operation. However, repeated use of the jaws and the large pressures transferred by the jaws to the mandrel stems during operation will result in wear of these jaws. Such wear ultimately results in slippage whereby when the jaws first engage with the mandrel stem and a pulling force is applied the jaws may "slip" on the mandrel stem before managing to obtain a sufficient grip to correctly transfer a setting load. It will be appreciated that the measurement method now employed will not be effected by any initial slippage since whilst the effect of slippage will result in an increased value of $T_e$ (mandrel entry time) on the pressure/time curve, it will have no subsequent effect on the time difference between the entry time and the setting time. However, by again pre-determining an acceptable entry time (again by evaluating an average mandrel entry time for a known set of rivets) the system is also able to monitor this parameter and in the event that the entry time for any particular setting operation exceeds the tolerance band associated with the optimum pre-determined mandrel entry time, then the system can indicate jaw slippage by an appropriate output signal allowing the operator to replace or repair the jaws where appropriate.

Whilst this preferred embodiment discusses the application of the monitoring method and system for use with conventional blind rivets (14), as described with reference to FIG. 1, the system is equally applicable to other types of blind rivets and other blind fasteners. Other types of blind rivets, different to those shown, include peel-type blind rivets whereby instead of simply deforming the rivet shell (76), it is split into a series of "legs" which engage with the rear of the workpiece. Alternatively, the system is equally applicable to closed-end blind rivets whereby the mandrel head is actually retained within a closed-cup rivet body wherein the majority of the length of the rivet body has an internal diameter less than the diameter to the head. In both these type of blind rivets the system is applicable without any modifications, since the mandrel head achieves the same function of being drawn into the main body of the cylindrical rivet to deform it into engagement with the rear of the workpiece.

This method is also applicable to other types of blind fasteners, such as blind rivet nuts (such as those sold by the applicant under the Trademark POP NUT) or other type of substantially tubular fastener which results in their remote end (blind end) being deformed into engagement with the rear surface of a workpiece. For example, instead of a mandrel head engaging with the exterior surface of the tubular body to deform it, the mandrel stem could be held in screw threaded engagement with the remote end to effect similar deformation of this blind side of the rivet into engagement with workpiece. Again, the setting of all such tubular bodies in this manner follow a similar load/time curve to that discussed with reference to conventional blind rivets, requiring an appropriate setting load or setting pressure to be established before deformation of the tubular body as achieved. Again, the system of the current invention is equally applicable.

For clarity, it is to be appreciated that where the term "fastener" or "rivet" is used within this Patent Specification it is intended to cover all blind fasteners having a substantially tubular body whereby its blind end is deformed into contact with the rear surface of a workpiece resulting from a load being transferred to this blind end by an appropriate mandrel engaging with the free end to achieve such deformation. Furthermore, it is to be appreciated that whilst the preferred embodiment discusses measuring pressure against time, the exact force or load being applied to the fastener is readily calculable and directly proportional to such pressure. Thus, the monitoring technique is considered to be achieved by monitoring the load or pressure applied to the mandrel by the rivet setting tool against time, either by determination of the pressure or the exact load being applied.

The invention claimed is:

1. A method of monitoring a setting operation for a blind fastener, comprising the step of:

measuring, as a function of time, an electronic signal indicative of a load being applied to the fastener during the setting operation;

determining a mandrel entry load and an associated mandrel entry time from said signal;

determining a setting load and an associated setting time from said signal; and determining a time difference between said mandrel entry time and said setting time and comparing said time difference against a predetermined reference time difference associated with said fastener to determine whether the set fastener complies with a predetermined acceptable setting procedure.

2. The method as claimed in claim 1, wherein the difference between the setting load and the mandrel entry load is determined and compared against a predetermined reference load difference value to determine whether said set fastener complies with a predetermined acceptable setting procedure.

3. A method of monitoring a series of setting operations for at least two different blind fasteners, comprising the step of:

predetermining a sequence of blind fasteners to be set in said series and monitoring the setting operation of each of said fasteners in said series according to the method of claim 2, wherein the predetermined reference load value associated with each of the at least two different blind fasteners is preset against each of the setting operations for that fastener in said series.

4. The method as claimed in claim 1, wherein an output signal is generated in the event that said fastener set is determined not to comply with said predetermined acceptable fastener setting procedure.

5. The method as claimed in claim 1, comprising the step of analysing the difference between the determined time difference and the reference time difference when said fastener set is determined not to comply with said predetermined fastener setting procedure to identify the reason for non-compliance.

6. The method as claimed in claim 1, wherein the predetermined reference time difference is determined as the time difference between mandrel entry time and mandrel setting time of a blind fastener set in a known workpiece, and said step of comparing the measured time difference against said predetermined reference time difference comprising identifying whether or not said measured time difference is greater than said reference time difference by a predetermined value indicative of a free set operation and generating a reject signal in the event that such free set operation is detected.

7. The method as claimed in claim 6, further comprising determining a minimum load value after said mandrel entry load is determined and an associated minimum load time and comparing at least one of said minimum load value or minimum load time against a predetermined minimum load value or predetermined minimum load time to identify the reason for non-compliance.

8. The method as claimed in claim 1, further comprising the step of visually displaying a graphic plot of monitored load applied to the rivet against time.

9. A method of monitoring a series of setting operations for at least two different blind fasteners, comprising the step of:

predetermining the sequence of blind fasteners to be set in said series and monitoring the setting operation of each of said fasteners in said series according to the method of claim 1, wherein the predetermined reference time associated with each of the at least two different blind fasteners is preset against each of the setting operations for that particular fastener in said series.

10. The method as claimed in claim 9, wherein multiple setting operations are undertaken by a plurality of different setting tools wherein an electronic signal indicative of applied load is generated by each setting tool during a setting operation and each electronic signal is analysed sequentially according to the predetermined order of setting of said blind fasteners.

11. The method as claimed in claim 1, wherein said predetermined reference time is determined by undertaking a plurality of setting operations for a selected fastener type, measuring a signal indicative of the load being applied to the fastener during the setting operation, as a function of time;

determining a mandrel entry load and an associated mandrel entry time from said signal for each of said plurality of operations;

determining a setting load and an associated setting time from said signal for each of said plurality of operations;

averaging said determined values of mandrel entry load, mandrel entry time, setting load and maximum setting time for said plurality of operations, and calculating said time difference between said averaged mandrel entry time and said averaged setting time to provide said predetermined reference time difference.

12. The method as claimed in claim 1, wherein said predetermined reference time is determined by undertaking a plurality of setting operations for a selected fastener type, measuring a signal, which is indicative of the load being applied to the fastener during the setting operation, as a function of time;

determining a mandrel entry load and an associated mandrel entry time from said signal for each of said plurality of operations;

determining a setting load and an associated setting time from said signal for each of said plurality of operations;

determining the time difference between said mandrel entry time and said setting time;

averaging the determined values of said time differences for said plurality of operations to provide said predetermined reference time difference.

13. The method as claimed in claim 1, further comprising comparing said measured mandrel entry time against a predetermined mandrel entry time to determine wear of a set of jaws of a fastener setting tool.

14. A blind rivet setting system comprising:

a fastener setting tool;

a signal generating device for producing a signal indicative of a load being applied to a blind fastener during a setting operation;

a controller connected to said tool and to said signal generating device for measuring said signal as a function of time and determining therefrom (i) a mandrel entry load and an associated mandrel entry time, (ii) a setting load and an associated setting time, and (iii) the time difference between said mandrel entry time and said setting time, and comparing said time difference against a predetermined reference time difference associated with said fastener to determine whether a set fastener complies with a predetermined acceptable setting procedure.

15. A system as claimed in claim 14, further comprising a plurality of setting tools for setting at least two different blind fasteners, each tool having an associated signal generating device, and further wherein said controller is connected to each of said tools and said associated signal generating devices for analyzing each signal produced by said signal generating devices sequentially according to the order of setting of said blind fasteners.

16. A system as claimed in claim 14, further comprising an automated fastener feed system for supplying blind fastener to said setting tool.

17. A system as claimed in claim 16, wherein said automated fastener feed system is capable of delivering at least two different blind fasteners.

18. A system as claimed in claim 14, wherein said fastener setting tool comprises a fluid actuated piston for applying load to said fastener and said signal generating device comprises a pressure transducer.

19. A system as claimed in claim 14, wherein said controller includes a visual display for plotting the signal output versus time.

20. A system as claimed in claim 14, further comprising an indicator means which is actuated when said fastener set is determined not to comply with said predetermined acceptable fastener setting procedure.

* * * * *